United States Patent
Sertamo (10) Patent No.: US 8,401,821 B1
(45) Date of Patent: Mar. 19, 2013

(54) METHOD, APPARATUS AND COMPUTER PROGRAM FOR LATENCY MEASUREMENT

(71) Applicant: Renesas Mobile Corporation, Tokyo (JP)

(72) Inventor: Jaakko Sertamo, Tampere (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/633,549

(22) Filed: Oct. 2, 2012

(30) Foreign Application Priority Data

Mar. 29, 2012 (GB) .................................. 1205610.7

(51) Int. Cl.
*G06F 11/30* (2006.01)
(52) U.S. Cl. ..................................................... 702/182
(58) Field of Classification Search .................. 702/182, 702/183, 186; 347/5, 9, 12, 13, 14, 17, 19, 347/40, 42, 43, 49; 713/171, 176, 189, 190, 713/300, 500
See application file for complete search history.

(56) References Cited

U.S. PATENT DOCUMENTS

| 6,856,944 B2 * | 2/2005 | Hady et al. ..................... 702/188 |
| 8,190,801 B2 * | 5/2012 | Harris et al. .................. 710/113 |
| 2010/0057400 A1 | 3/2010 | Chou et al. |

FOREIGN PATENT DOCUMENTS

JP 2005-222446 A 8/2005

OTHER PUBLICATIONS

Search Report under Section 17 dated Jul. 9, 2012 which are issued in a related British Application No. GB1205610.7 (4 pages).

* cited by examiner

*Primary Examiner* — Aditya Bhat
(74) *Attorney, Agent, or Firm* — Lucas & Mercanti LLP; Robert P. Michal (57) ABSTRACT

A method, apparatus and computer program for measuring a latency associated with a transaction between logic units is described. In certain described examples, transactions take place over an on-chip interconnect, for example an interconnect forming part of a system-on-chip configuration. In certain described examples, time values obtained in response to signals indicative of transaction initiation events are added to a data queue. A transaction initiation event has an associated transaction identifier and each data queue is associated with a particular transaction identifier. The method and apparatus enable time values relating to transactions that overlap in time to be output from a data queue on receipt of a transaction completion event and thus measured.

23 Claims, 4 Drawing Sheets

METHOD, APPARATUS AND COMPUTER PROGRAM FOR LATENCY MEASUREMENT

CROSS REFERENCE TO RELATED APPLICATION

This application claims the benefit under 35 U.S.C. §119 (a) and 37 CFR 1.55 to UK patent application No. GB1205610.7 filed on 29 Mar. 2012, the entire content of which is hereby incorporated herein by reference.

TECHNICAL FIELD

The present invention relates to a method, apparatus and computer program for measuring a latency associated with a transaction between logic units, the transaction taking place over an on-chip interconnect.

BACKGROUND

Modern electronic devices often incorporate one or more integrated circuits. These integrated circuits may comprise a so-called system-on-chip, wherein one or more components of a computing or electronic system are integrated into a single electronic chip. Advances in manufacturing technologies allow a high number of transistors and other logic devices to be integrated into a single chip, thus allowing for advanced functionalities. For example, one or more microprocessors, memory blocks, power management components, external interfaces and functional circuitry may be integrated onto a single silicon substrate. Functional components of these systems may be grouped into what are referred-to as intellectual property (IP) cores. An IP core comprises a reusable unit of electronic chip design that, in most cases, embodies the intellectual property of a single party.

In a system-on-chip, two or more logic units, such as central processing units (CPUs) or Application-Specific Integrated Circuits (ASICs), and/or two or more IP cores may be coupled together on the chip using an interconnect. In this context, an interconnect is a form of system communications bus that allows inter-component communication. In a system-on-chip, the interconnect is integrated into the chip, i.e. comprises an on-chip interconnect. Communications over an on-chip interconnect may form part of transactions between logic units; for example, a first processor may start a transaction that comprises the sending of information to a second processor over an on-chip interconnect.

A combination of increased transistor densities and high clock frequencies means that logic units are subject to a high number of transactions in a given time period, i.e. experience a high transaction load. An on-chip interconnect is also subject to the same high transaction loads. In these cases, there may be a design compromise between high transaction throughput rates and transaction latencies, the latter being the time it takes to complete a transaction including communication over the interconnect. If transaction throughput rates are low, operations on the electronic device may be delayed leading to unresponsiveness. To increase throughput over an interconnect, pipeline stages may be introduced. The pipeline stages may be implemented by one or more of an interconnect controller, one or more IP cores or one or more CPUs. However, pipelining results in increased latencies and leads to transactions being completed out-of-order. Latencies for communications between logic units can lead to errors due to transactions timing out or becoming desynchronised. This is why certain applications and functions have limits reflecting the amount of tolerated latency. For example, certain random access memory sharing systems for an electronic device may only function with specified transaction latencies. Hardware systems thus need to be designed to meet these limits.

In the design and operation of system-on-chip devices, for example to effect the compromise described above, it is useful to have a reliable measurement of a transaction latency. However, latency measurements are often difficult to obtain and are often unreliable.

U.S. Pat. No. 8,032,329 B2 describes a performance monitoring apparatus that may be located on an interconnect of a fabricated integrated circuit. The performance monitoring apparatus has an event generator sub-module that generates monitoring events and event measurements associated with transactions between initiator IP cores and target IP cores over the interconnect. A performance counter module aggregates events and event measurements received from the apparatus into quantities of performance metrics associated with transactions between the IP cores over the interconnect. The performance monitoring apparatus measures latency by repeatedly sampling one event at a time to save silicon area and to reduce hardware complexity. This means, however, that not all latency events will be measured, i.e. only non-overlapping events are monitored and measured. This affects accuracy and reliability.

There is thus a need for accurate and reliable latency measurements for transactions that take place between logic units and components over an on-chip interconnect.

SUMMARY

In accordance with a first aspect of the present invention, there is provided a method of measuring a latency associated with a transaction between logic units, the transaction taking place over an on-chip interconnect, the method comprising:
  in response to a first transaction initiation event, the first transaction initiation event having an associated transaction identifier, adding a first time value to a first data queue, the first data queue being associated with the transaction identifier for the first transaction initiation event;
  in response to a second transaction initiation event, the second transaction initiation event having an associated transaction identifier, adding a second time value to a second data queue, the second data queue being associated with the transaction identifier for the second transaction initiation event;
  in response to a first transaction completion event, the first transaction completion event having an associated transaction identifier:
  outputting the first time value from the first data queue if the transaction identifier associated with the first transaction completion event corresponds to the transaction identifier associated with the first transaction initiation event, and
  outputting the second time value from the second data queue if the transaction identifier associated with the first transaction completion event corresponds to the second transaction identifier associated with the second transaction initiation event; and
  determining a first latency measurement using a time value corresponding to the first transaction completion event and the one of the first time value and the second time value that is output.

The use of data queues associated with individual transaction identifiers enables overlapping transactions to be monitored and measured. For example, a time value is output from an appropriate data queue based on a transaction identifier associated with a transaction completion event; either a first or second data queue is selected based on the transaction identifier. This allows multiple transactions to be monitored in parallel and thus for latency measurements to be determined for transactions whose active periods overlap in time. This in turn increases accuracy as the latencies for a larger number of, and in some cases all, transactions are monitored.

In an embodiment, the method comprises, in response to a second transaction completion event, the second transaction completion event having an associated transaction identifier:
  outputting the second time value from the second data queue if the transaction identifier associated with the first transaction completion event corresponded to the transaction identifier associated with the first transaction initiation event and the transaction identifier associated with the second transaction completion event corresponds to the transaction identifier associated with the second transaction initiation event, and
  outputting the first time value from the first data queue if the transaction identifier associated with the first transaction completion event corresponded to the transaction identifier associated with the second transaction initiation event and the transaction identifier associated with the second transaction completion event corresponds to the transaction identifier associated with the first transaction initiation event; and
  determining a second latency measurement using a time value corresponding to the second transaction completion event and the one of the second time value and the first time value that is output in response to the second transaction completion event.

In this case two latency measurements are determined and the order in which events for a first and second transaction are received does not affect these measurements.

In an embodiment, the first and second data queues comprise First-In First-Out (FIFO) data queues. FIFO data queues provide a simple and effective way to implement the data queues. They allow for a new time value to be pushed onto the back of the queue and for an oldest time value for a particular transaction identifier to be popped from the front of the queue. By using FIFO data queues, the on-chip design of a latency measurement apparatus is simplified.

In an embodiment, the method comprises counting a number of transaction completion events and summing a plurality of latency measurements for the number of transaction completion events, wherein an average latency measurement is calculated based on the counted number of transaction completion events and the summed latency measurements. These steps enable an average latency for all transactions monitored in an active state or a predefined time period to be calculated.

In an embodiment, the method comprises comparing the first latency measurement with a stored minimum and/or maximum latency value and replacing the stored minimum and/or maximum latency value with the first latency measurement if the first latency measurement is respectively less and/or greater than the stored minimum and/or maximum latency value. These steps may also be applied to the second latency measurement and any other determined latency measurements. These steps enable an accurate minimum and/or maximum latency value to be simply determined. As overlapping transactions are monitored and measured the minimum and/or maximum latency value are more reliable than other approaches that do not monitor and measure overlapping transactions; for example, an overlapping transaction may consistently have a large latency but this would not be counted towards a maximum latency value in the other approaches.

In an embodiment, the method comprises, in response to a third transaction initiation event, the third transaction initiation event having an associated transaction identifier and before at least one of the first time value and the second time value are output from their respective data queues:
  adding a third time value to the first data queue if the transaction identifier associated with the third transaction initiation event corresponds to the transaction identifier associated with the first transaction initiation event, the first data queue comprising, before addition, the first time value, and
  adding a third time value to the second data queue if the transaction identifier associated with the third transaction initiation event corresponds to the transaction identifier associated with the second transaction initiation event, the second data queue comprising, before addition, the second time value.

In this case, a data queue stores multiple time values. This has an advantage of allowing transactions with a common transaction identifier to overlap. For example, if a first transaction initiation event is received for a first transaction having a transaction identifier and a second transaction initiation event is received for a second transaction that shares the transaction identifier, the second transaction initiation event being received before a transaction completion event is received that is associated with the transaction identifier, then time values associated with both transactions will be queued in a common data queue associated with the transaction identifiers.

According to a second aspect of the present invention, there is provided a latency measurement apparatus for measuring a latency of a transaction between logic units, the transaction taking place over an on-chip interconnect, the latency measurement apparatus comprising:
  a first queue controller arranged to add, responsive to receiving a transaction initiation event, a time value as an initiation time value to a data queue, the data queue being associated with a transaction identifier for the received transaction initiation event; and
  a second queue controller arranged to access, responsive to receiving a transaction completion event, an initiation time value in a data queue, the data queue being associated with a transaction identifier for the received transaction completion event,
  wherein a latency measurement is determined based on the accessed initiation time value and a time value generated in response to receiving said transaction completion event, and
  wherein, the first queue controller is arranged to add, following receipt of a first transaction initiation event, a second initiation time value for a second transaction initiation event to a data queue before a transaction completion event is received that has an associated transaction identifier corresponding to a transaction identifier associated with the first transaction initiation event.

This second aspect has advantages similar to those of the first aspect, namely that overlapping transactions are monitored and measured. For example, both transaction initiation events are monitored even though a transaction completion event for the first transaction initiation event has not yet been received.

In an embodiment, the second queue controller is arranged to access the second initiation time value in response to a transaction completion event before a transaction completion event is received that has an associated transaction identifier corresponding to the transaction identifier associated with the first transaction initiation event.

In this case a latency measurement for a second transaction may be obtained notwithstanding that the first transaction was initiated before the second transaction and the first transaction remains uncompleted. By capturing latency measurements for more transactions a more accurate and reliable apparatus is provided.

In an embodiment, the first queue controller is arranged to add an initiation time value to a data queue that comprises a plurality of initiation time values associated with a particular transaction identifier and the second queue controller is arranged to access the earliest initiation time value from a data queue in response to receiving a transaction completion event.

This shares advantages with the method embodiment that queues multiple transaction time values that share a common transaction identifier.

In an embodiment, each data queue comprises a First-In First-Out data queue.

In an embodiment there is a transaction counter to count a number of received transaction completion events and a latency accumulator to sum a plurality of latency values, wherein an average latency is calculated based upon the values of transaction counter and the latency accumulator. In certain cases, the transaction counter and latency accumulator are arranged to respectively count and sum a particular subset of transaction identifiers.

In an embodiment, there is a minimum latency comparator to compare a determined latency measurement with a stored minimum latency value and replace the stored minimum latency value with the determined latency measurement if the determined latency measurement is less than the stored minimum latency value and a maximum latency comparator to compare a determined latency measurement with a stored maximum latency value and replace the stored maximum latency value with the determined latency measurement if the determined latency measurement is greater than the stored maximum latency value.

These embodiments share at least some of the advantages of the corresponding method embodiments.

In an embodiment, the latency measurement apparatus has an active state and an inactive state and a latency measurement is only determined in the active state. This enables latency measurements to be started and stopped in accordance with system testing.

According to a third aspect of the present invention, there is provided a system-on-a-chip for an electronic device comprises:
 a first processor;
 a second processor;
 an interconnect for coupling the first processor and second processor, the first processor and second processor communicating through one or more transactions across the interconnect; and
 a latency measurement apparatus according to the second aspect or any of the subsequent embodiments of the second aspect.

According to a fourth aspect of the present invention, there is provided a computer program comprising instructions executable by a computerised device to cause the computerised device to perform a method for measuring a latency associated with a transaction between logic units, the transaction taking place over an on-chip interconnect, the method comprising:

in response to a first transaction initiation event, the first transaction initiation event having an associated transaction identifier, adding a first time value to a first data queue, the first data queue being associated with the transaction identifier for the first transaction initiation event;
 in response to a second transaction initiation event, the second transaction initiation event having an associated transaction identifier, adding a second time value to a second data queue, the second data queue being associated with the transaction identifier for the second transaction initiation event;
 in response to a first transaction completion event, the first transaction completion event having an associated transaction identifier:
 outputting the first time value from the first data queue if the transaction identifier associated with the first transaction completion event corresponds to the transaction identifier associated with the first transaction initiation event, and
 outputting the second time value from the second data queue if the transaction identifier associated with the first transaction completion event corresponds to the second transaction identifier associated with the second transaction initiation event; and
 determining a first latency measurement using a time value corresponding to the first transaction completion event and the one of the first time value and the second time value that is output.

The fourth aspect may have embodiments that reflect the embodiments of the first aspect.

There may be provided a computer program product comprising a non-transitory computer-readable storage medium having computer readable instructions stored thereon, the computer readable instructions being executable by a computerised device to cause the computerised device to perform as described above.

Further features and advantages of the invention will become apparent from the following description of preferred embodiments of the invention, given by way of example only, which is made with reference to the accompanying drawings.

DETAILED DESCRIPTION

Certain examples described below provide an apparatus and method for measuring the latencies of transactions that occur over an on-chip interconnect. These examples make use of data queues associated with transaction identifiers. Time values recorded in response to an initiated transaction with a particular transaction identifier are placed onto a data queue associated with the transaction identifier. When an indication that a transaction has completed is received for a particular transaction identifier, a time value is taken from the data queue for that transaction identifier. In certain cases, the removed time value is then compared to a current time value to determine a latency value. These examples take into account all individual latencies as a single data queue is able to store multiple time values for a particular transaction and multiple data queues are implemented for individual transaction identifiers.

Figure 1:
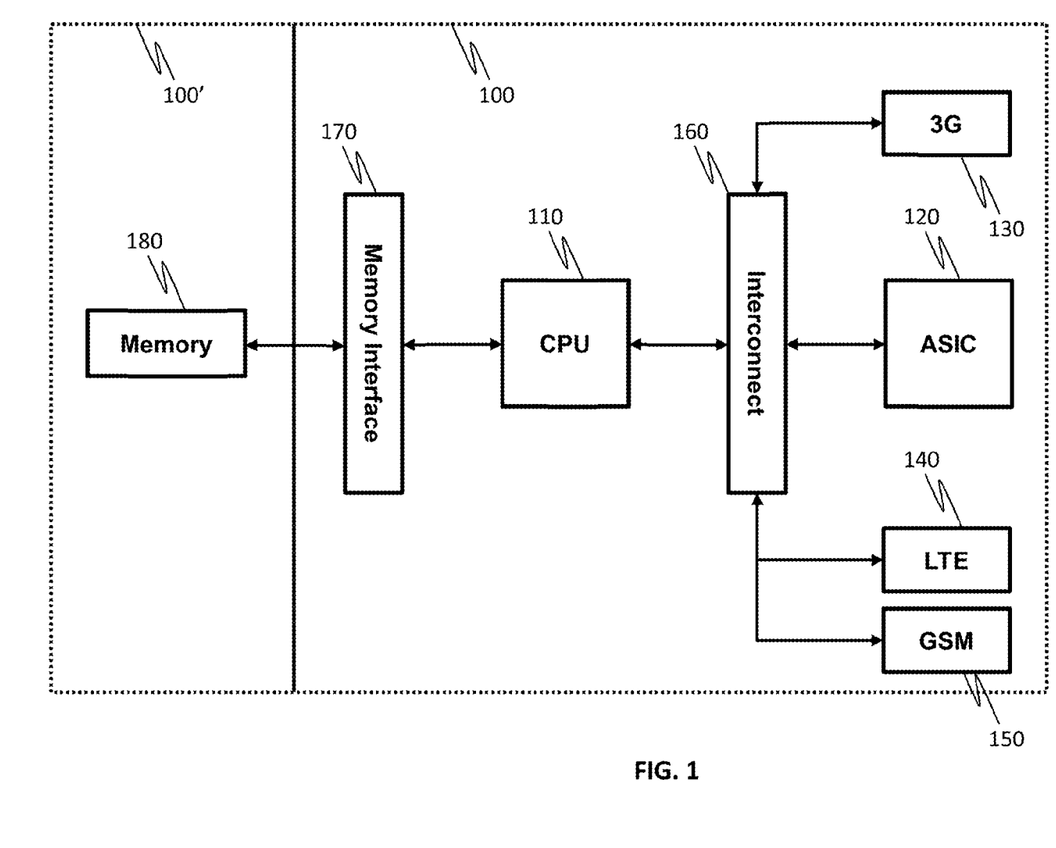
FIG. 1 is a simplified schematic drawing showing an exemplary system-on-chip configuration.

FIG. 1 is a simplified schematic drawing showing an exemplary system-on-chip configuration. In this example, the system-on-chip configuration is suitable for use in a wireless device such as a wireless telecommunications device. "Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is deemed to be synonymous with the term "wireless device", as it is often used to refer to wireless devices in general, and particularly mobile wireless devices.

The system-on-chip 100 comprises a CPU 110, an ASIC 120, a 3G processing module 130, an LTE processing module 140, a GSM processing module 150, an interconnect 160, and a memory interface 170. These components are integrated into a single chip, as illustrated by the first dashed boundary 100. The 3G processing module 130 may comprise one or more logic units, such as CPUs or dedicated processing circuitry, for processing data in accordance with International Telecommunication Union's International Mobile Telecommunications-2000 (IMT-2000) specifications for Third Generation (3G) mobile communications. The LTE processing module 140 may comprise one or more logic units, such as CPUs or dedicated processing circuitry, for processing data in accordance with a Third Generation Partnership Project's (3GPP) Long Term Evolution (LTE) standard. The GSM processing module 150 may comprise one or more logic units, such as CPUs or dedicated processing circuitry, for processing data in accordance with a Groupe Spécial Mobile (GSM) standard developed by the European Telecommunications Standards Institute (ETSI). The ASIC 120 may comprise application specific logic units, such as one or more CPUs or dedicated processing circuitry. The system-on-chip 100 may utilise external memory, such as off-chip random access memory (RAM) 180 via memory interface 170. In an alternative configuration, marked by the second dashed boundary in FIG. 1, memory 180 may form part of the system-on-chip 100'. Memory interface 170 may form part of interconnect 160 or may be separately implemented depending on the application.

Figure 2:
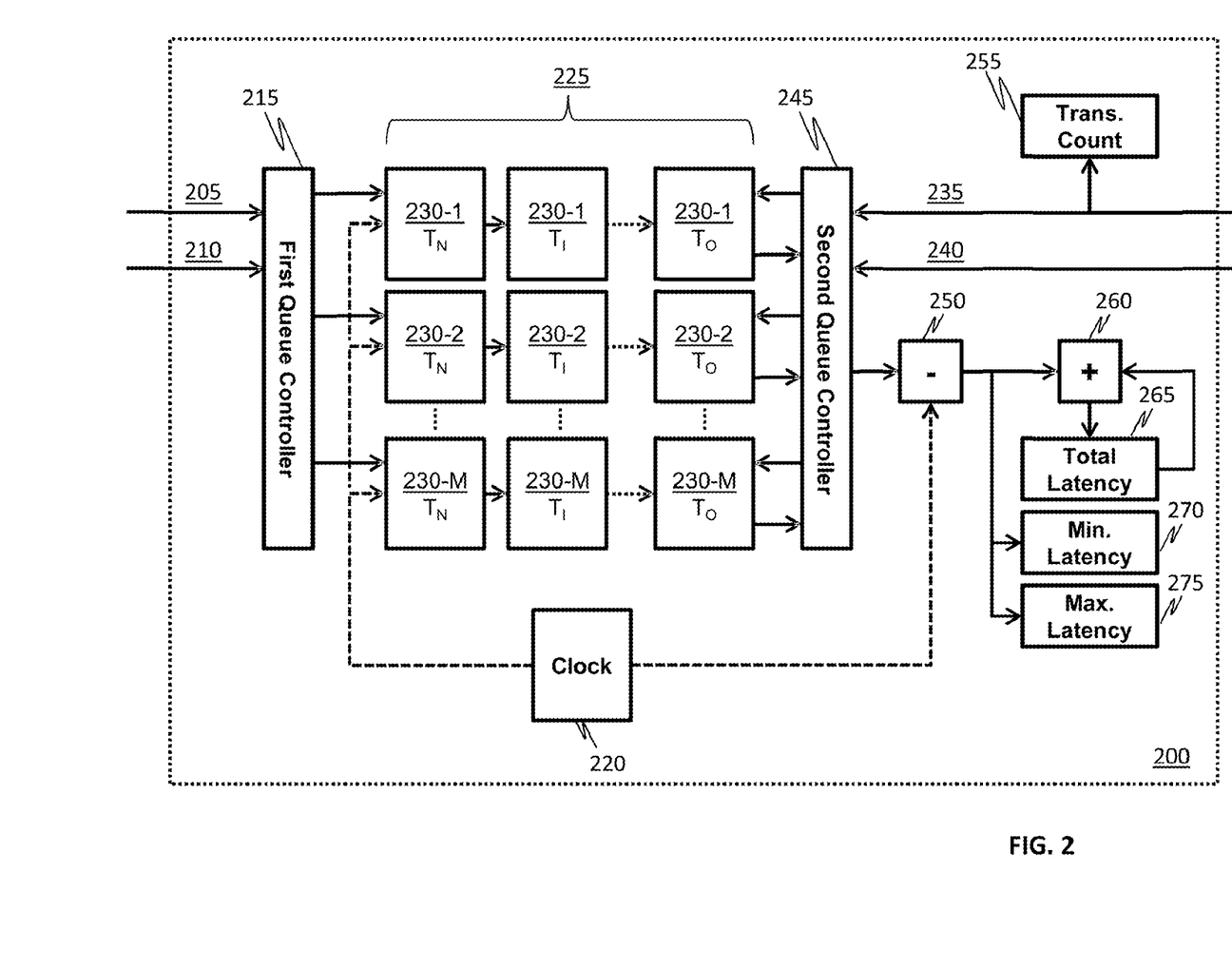
FIG. 2 is a simplified schematic drawing showing an example of a latency measurement apparatus according to an embodiment of the present invention.

FIG. 2 is a simplified schematic drawing showing a latency measurement apparatus 200 according to an example. In certain implementations, the latency measurement apparatus 200 forms part of the interconnect. In other implementations, the latency measurement apparatus 200 may alternatively form part of an IP core that is closely related to the interconnect, for example a bus socket or interface component. The latency measurement apparatus 200 makes use of interconnect transaction identifiers. An interconnect transaction identifier identifies a particular transaction that is performed by logic units, such as CPUs 110, processors, ASICs 120 and processing modules 130-150, over the interconnect 160. Interconnect transaction identifiers are assigned by an initiator interface, i.e. an interface for an initiating logic unit. Many standards for logic unit communications provide an identifier for transactionrs between the logic units, examples include on-chip interconnect interfaces such as the Advanced eXtensible Interface (AXI), which forms part of the Advanced Microcontroller Bus Architecture (AMBA) specifications (from version 3), and the Open Core Protocol (OCP) from the Open Core Protocol International Partnership (OCP-IP). The exact implementation of the interconnect transaction identifiers may vary according to which standard is used, for example with the OCP standard tag identifiers may be used as interconnect transaction identifiers. In any case, the examples described herein may be applied to any supporting standard. The values of interconnect transaction identifiers may be application specific. The type of interconnect transaction identifiers that are implemented may also be used to specify the ordering model of the interconnect interface.

In FIG. 2 the latency measurement apparatus 200 receives two sets of signals over, in this particular example, four signal lines. A first set comprises a first signal indicating a transaction initiation event that is received on a first signal line 205 and a second signal comprising a corresponding interconnect transaction identifier that is received on a second signal line 210, i.e. a transaction identifier that identifies the transaction associated with the initiation event. In certain examples, these two signals may form part of a single signal, e.g. signals may be received on a common signal line. In other examples, one or more channels relating to the interconnect may be monitored by the latency measurement apparatus 200 to determine whether a first signal and/or second signal is present. Individual signal lines are shown in the illustrated examples for ease of explanation. A transaction initiation event is an event that marks the beginning of a transaction, i.e. the beginning of communication between logic units over the interconnect. For example, the transaction could be a data read or write command. When using the AMBA AXI specification, the first signal may comprise AxVALID and AxREADY channels being HIGH on the same clock cycle, where x stands for W (Write) or R (Read) depending on whether a write or read operation is being performed. In this case, the second signal may comprise an AxID present during the same clock cycle. In other standards such as OCP a common channel may be shared between write and read operations. The exact nature of the signalling may vary depending on the standard used and the characteristics of an implementation. When a transaction is initiated, it is assigned an interconnect transaction identifier, and thus the two signals (indicating a transaction initiation event and the corresponding interconnect transaction identifier respectively) are associated with each other.

The first and second signal lines 205, 210 are coupled to a first queue controller 215. When the latency measurement apparatus 200 is enabled, on receipt of a new transaction initiation event on the first signal line 205, the first queue controller 215 is arranged to obtain a timestamp, i.e. a time value indicating the current time, which indicates the time of receipt of the transaction initiation event. In the present example, the timestamp is provided by a reference clock 220 that forms part of the latency measurement apparatus 200. The reference clock, in the present example, is coupled to the first queue controller 215; hence a current time on receipt is obtained from the clock 220 when a transaction initiation event is detected by the first queue controller 215 due to the presence of a signal on the first signal line 205. In other examples, the latency measurement apparatus 200 may alternatively be arranged to receive a clock signal in order to obtain a time stamp; for example the first queue controller 215 may be arranged to use a common system clock signal.

The first queue controller 215 controls a plurality of data queues 225. In this example, each data queue comprises a First-In First-Out (FIFO) data queue or data structure. In FIG. 2, the latency measurement apparatus 200 manages M data queues that correspond to M unique interconnect transaction identifiers. Each data queue stores one or more timestamps. As described later with regard to FIG. 3A, the first data controller 215 is arranged to add (e.g. "push") an obtained timestamp to a particular data queue. In FIG. 2 each data queue has a timestamp $T_O$ representing the oldest timestamp in the queue, a timestamp $T_1$ representing one or more intermediate timestamps in the queue and a timestamp $T_N$ representing the newest timestamp in the queue. This illustrates the FIFO configuration of the present example. For ease of explanation, each data queue in FIG. 2 is shown as being the same length. However, in actual implementations each data queue may vary in size independently of other data queues, for example depending on how many transaction initiation events have been received for a particular transaction identifier. In one example, a new data queue is generated when a new interconnect transaction identifier is received on the second signal line 210, i.e. a transaction identifier associated with a transaction for which no initiation events have been received and/or a transaction whose previous timestamps have all been removed from a previous data queue. This dynamic queue structure can help reduce physical memory requirements. Alternatively, if the set of interconnect transaction identifiers is relatively small in size, e.g. is manageable in hardware and/or software, predefined data queues for each transaction identifier in the set may be generated.

The second set of signals received by the latency measurement apparatus 200 comprises a third signal indicating a transaction completion event that is received on a third signal line 235 and a fourth signal comprising a corresponding interconnect transaction identifier that is received on a fourth signal line 240, i.e. a transaction identifier that identifies the transaction associated with the completion event. As before, these two signals may form part of a single signal, e.g. signals may be received on a single signal line or taken from a set of channels accessible to the latency measurement apparatus 200. A transaction completion event is an event that marks the end of a transaction, i.e. in this example the end of communication between logic units over the interconnect. The latency measurement apparatus 200 is arranged to accommodate transactions that complete out-of-order. For example, if a first transaction is initiated at a first time, and a second transaction is initiated at a second time that is later than the first time, the latency measurement apparatus 200 can accommodate the second transaction completing at a third time that is before the completion time of the first transaction. In more complex scenarios, there may be a plurality of transactions that have been initiated but have not yet completed, wherein the completion times may be independent of the initiation order of the transactions. The latency measurement apparatus 200 makes use of the interconnect transaction identifiers to associate a transaction completion event for a particular transaction to a transaction initiation event for the same transaction. It does this by implementing the data queues as described above, and by using a second queue controller 245 that removes a timestamp from a particular data queue in response to a transaction completion event.

FIG. 2 shows the second queue controller 245 coupled to the third signal line 235 and the fourth signal line 240. The second queue controller 245 is arranged to determine an interconnect transaction identifier received over the fourth signal line 240, such an identifier being received in association with a particular transaction completion event indicated by a signal on the third signal line 235. The second queue controller 245 is arranged to use the determined interconnect transaction identifier to select an appropriate data queue, i.e. a data queue associated with said interconnect transaction identifier. In the example of FIG. 2, the second queue controller 245 removes a timestamp from selected data queue. In a FIFO example, the second queue controller 245 is arranged to remove (e.g. "pop") the oldest timestamp $T_O$ in the data queue. The second queue controller 245 need not explicitly determine which timestamp is the oldest. For example, if timestamps are added to the back of a data queue, i.e. to the left in FIG. 2, then the second queue controller 245 need only remove the timestamp currently at the front of the queue, i.e. to the right in FIG. 2. Each data queue may hold multiple outstanding transactions for a transaction identifier. Transactions for a particular transaction identifier are completed in the order they are initiated.

In the example of FIG. 2, a timestamp removed from a particular data queue is passed to a subtractor 250 that is also coupled to reference clock 220. Subtractor 250 comprises logic to subtract a current timestamp from the removed or popped timestamp, e.g. subtract a time value indicative of a time of receipt of a transaction completion event. This produces a latency time value, i.e. a latency measurement, for the transaction.

In the example of FIG. 2, the third signal line 235 is also coupled to a transaction counter 255. The transaction counter 255 counts the number of transaction completion event signals received on the third signal line 235 and uses this to determine a number of transactions. The transaction counter 255 may be reset to zero (or other appropriate value) on activation, which may occur when the latency measurement apparatus 200 is set to an active state. Alternatively, the transaction counter may count transactions over a defined period that includes breaks for inactive apparatus states.

FIG. 2 also shows a summing component 260 that is coupled to the subtractor 250 and a total latency register 265. The total latency register 265 accumulates determined latency time values so as to determine a total or cumulative latency for a defined time period such as the time the latency measurement apparatus 200 is active. For example, summing component 260 may retrieve a total latency value from the total latency register 265 and add a newly determined latency time value. The new total latency value may then replace the old total latency value in the total latency register 265. Latency values may be accumulated over a particular time period when the latency measurement apparatus 200 is active or may be accumulated over several active/inactive state transitions, e.g. any configured time period. The values stored in the total latency register 265 and the transaction counter 255 may be accessed to calculate an average latency value, for example by dividing a total latency value stored in the total latency register 265 by a count value stored by the transaction counter 255. In certain examples, such a calculation may be performed by the latency measurement apparatus 200; in other examples, the total latency register 265 and the transaction counter 255, amongst other components, may be accessible by software operating upon the system-on-chip.

For example, applicable to any and/or all registers of the latency measurement apparatus 200, values stored in one or more of the registers are mapped to a (e.g. Read-only) register that is seen as memory-mapped peripheral by a CPU, or similar device, controlling the latency measurement apparatus 200 at a high-level, e.g. at the level of activating/deactivating the latency measurement apparatus 200 and analysing measurements. In certain implementations, one or more register values are visibility to any device that can make address-mapped transactions.

FIG. 2 also shows a minimum latency module 270 and a maximum latency module 275. Both modules are coupled to the subtractor 250 and receive a newly determined latency time value. The minimum latency module 270 compares a determined latency time value with a stored minimum latency value and replaces the stored minimum latency value with the determined latency value if the determined latency value is less than the stored minimum latency value. The maximum latency comparator 275 compares a determined latency value with a stored maximum latency value and replaces the stored maximum latency value with the determined latency value if the determined latency value is greater than the stored maximum latency value. In this manner the minimum and maximum latency time values can be tracked for all transactions.

Figure 3A:
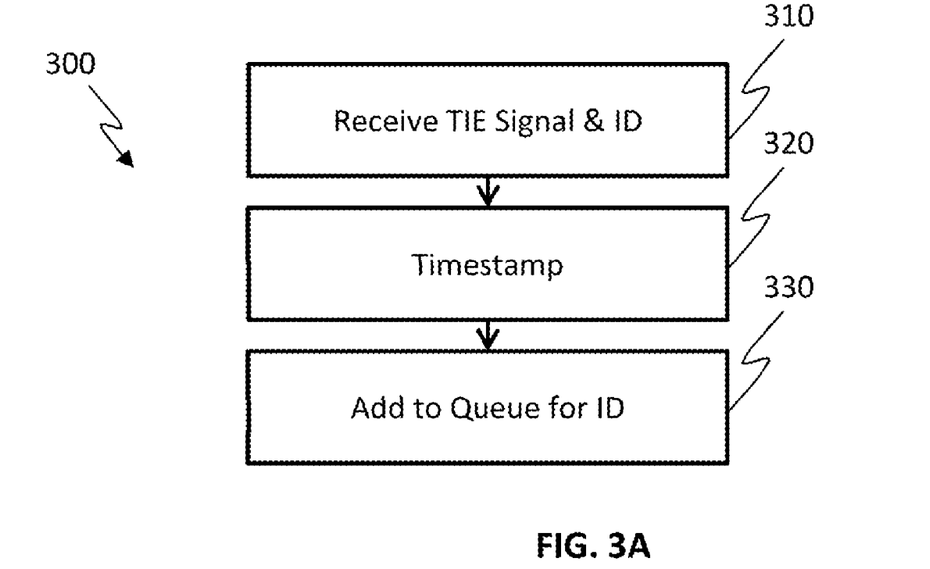
FIG. 3A is a flow diagram showing an example of steps for adding a time value to a data queue according to an embodiment of the present invention.

FIG. 3A is a flow diagram showing steps 300 for adding a time value to a data queue according to an example. The steps may be performed using the latency measurement apparatus 200 of FIG. 2. At step 310 a transaction initiation event (TIE) signal is received. The transaction initiation event signal has a corresponding transaction identifier. For example, a transaction initiation event signal may be received on the first signal line 205 of FIG. 2 together with an interconnect transaction identifier on the second signal line 210 of FIG. 2. The two signals may be received at the same time, within a predefined time period (e.g. a preset time window) or may be associated in another manner. At step 320 a timestamp is obtained. This timestamp records the time at which the transaction initiation event signal is received, i.e. may be referred to as an initiation time value. The timestamp may be obtained from the reference clock 220 of FIG. 2. The timestamp may equal the time of receipt or may comprise an approximation of said time, e.g. have a tolerated and/or known offset. At step 330 the obtained timestamp is added (e.g. "pushed") to a data queue associated with the transaction identifier corresponding to the received transaction initiation event signal. In FIG. 2, in response to a signal on the first signal line 205 and an interconnect transaction identifier received on the second signal line 210, the first queue controller 215 adds an obtained timestamp to a data queue associated with the received transaction identifier. For example, if the interconnect transaction identifier is "2" then a new timestamp value is added as a new queue item 230-2, i.e. added to the second data queue.

Figure 3B:
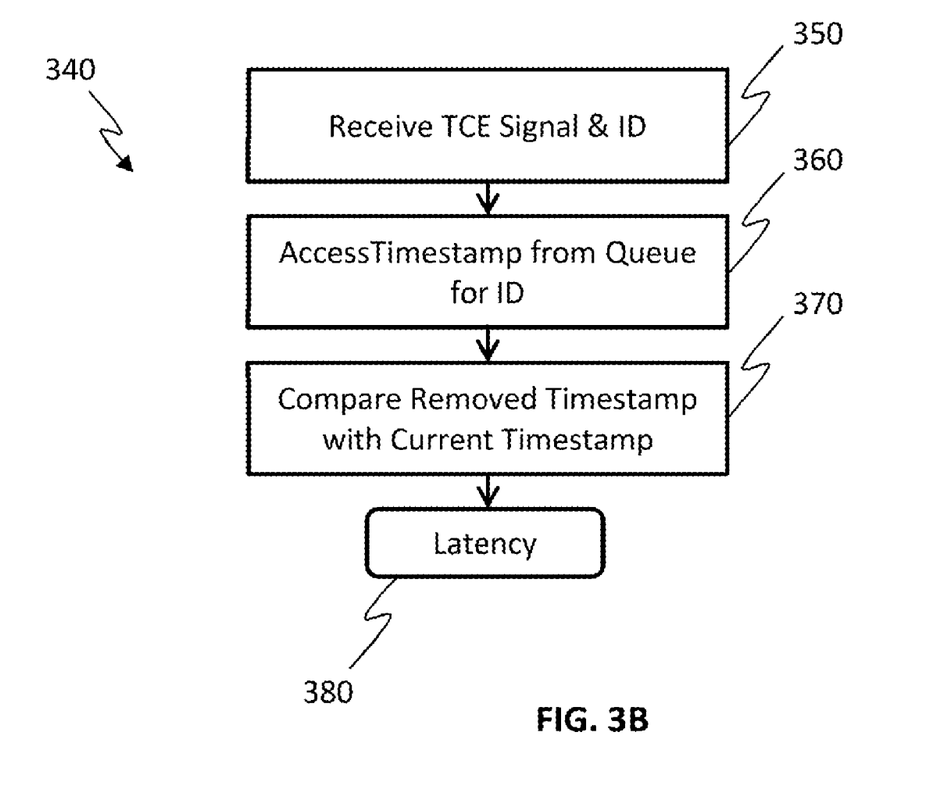
FIG. 3B is a flow diagram showing an example of steps for accessing a time value in a data queue according to an embodiment of the present invention.

FIG. 3B is a flow diagram showing steps 340 for removing a time value from a data queue according to an example. At step 350, a transaction completion event (TCE) signal is received. The transaction completion event signal has a corresponding transaction identifier. For example, a transaction completion event signal may be received on the third signal line 235 of FIG. 2 together with an interconnect transaction identifier on the fourth signal line 240 of FIG. 2. As before, the two signals may be received at the same time, within a predefined time period (e.g. a preset time window) or may be associated in another manner. At step 360, the received transaction identifier, which corresponds to the received transaction completion event, i.e. each event relates to a transaction that is identified using a transaction identifier, is used to determine a data queue from which to access a timestamp. In FIG. 2, the second queue controller 245 uses a received interconnect transaction identifier to select a data queue associated with said received identifier. In an example that uses a FIFO data queue, the oldest timestamp $T_O$ is removed (e.g. "popped") from a determined data queue. At step 370 the accessed or removed timestamp is compared with a timestamp indicating the current time, i.e. an exact or approximate time of receipt for the transaction completion event signal. In FIG. 2, a removed timestamp is subtracted from a current timestamp by subtractor 250. This results in a latency measurement in the form of a latency time value at step 380. A process comprising the steps of FIGS. 3A and 3B thus enables a latency measurement for a transaction to be determined, and this same process may be performed for each initiative and completion event during a period when the latency measurement apparatus is enabled.

Figure 4:
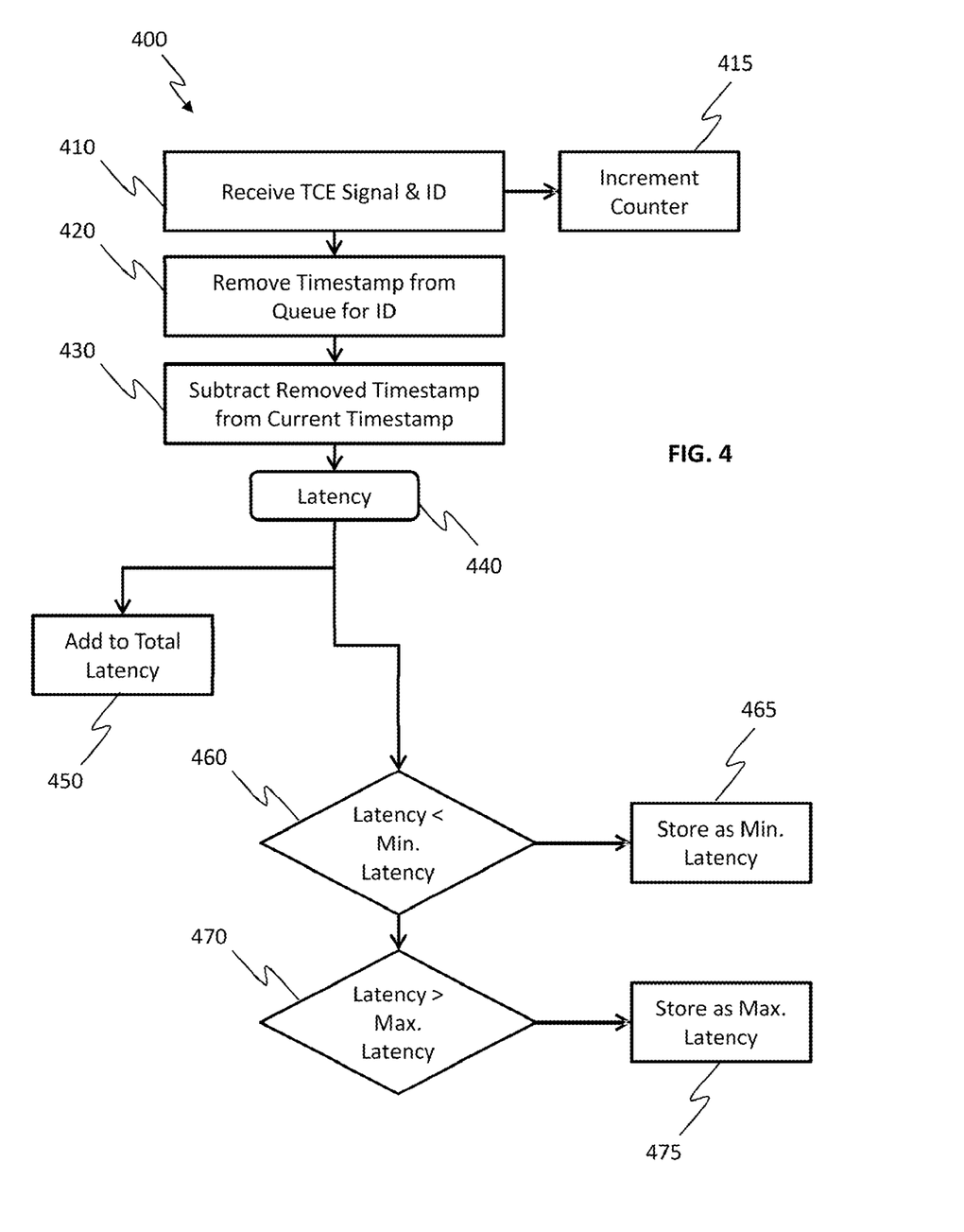
FIG. 4 is a flow diagram showing an example of a number of steps following removal of a time value according to an embodiment of the present invention.

FIG. 4 is a flow diagram showing a number of steps 400 following removal of a time value according to an example. The steps relate to a variation of the method shown in FIG. 3B. Steps 410 to 440 respectively correspond to steps 350 to 380 described above. In addition, in FIG. 4, at step 415 a counter is incremented following receipt of a transaction completion event signal, i.e. responsive to a transaction completion event. In FIG. 2, the transaction counter 255 is coupled to the third signal line 235 and so is incremented when a new transaction completion event signal is present on the third signal line 235. Following the determination of a latency time value at step 440, the latency time value is added to a running sum or total of latency time values at step 450. In FIG. 2, this is achieved using summing component 260 to add the latency time value 440 to a retrieved sum stored in total latency register 265. At step 460, the latency time value 440 is compared with a minimum latency time value. An initial minimum latency value may be an appropriate approximation to infinity (e.g. "999"). The minimum latency value may be stored in a register which may or may not form part of the latency measurement apparatus 200. If the latency time value 440 is less than the minimum latency time value then the minimum latency time value is replaced by the current latency value 440 at step 465. For example, a minimum latency value stored in a register may be overwritten with the current latency value. At step 470, the latency time value 440 is compared with a maximum latency time value. An initial maximum latency value may be zero or an appropriate approximation to zero. The maximum latency value may be stored in a register which may or may not form part of the latency measurement apparatus 200. If the latency time value 440 is greater than the maximum latency time value then the maximum latency time value is replaced by the current latency value 440 at step 475. For example, a maximum latency value stored in a register may be overwritten with the current latency value.

Examples described herein provide an apparatus and method for use in measuring latencies of on-chip transactions. They have an advantage of being accurate and reliable. They achieve this through the use of multiple data queues for multiple transaction identifiers, wherein each data queue may hold multiple outstanding transactions for a particular transaction identifier. Hence, transactions with different transaction identifiers that overlap in time may be monitored and measured. Multiple transactions for a common transaction identifier that overlap in time may also be monitored and measured. As the examples described herein enable a realistic approximation of latency to be determined, the need for a large safety margin in system timings is reduced, leading to a more efficient and/or reduced cost hardware design. In certain cases, latency varies as function of interconnect load; by using the method and apparatus described herein a realistic approximation of latency can be determined for different loading. The accurate and reliable latency measurements provided by the described examples are important for the design of advanced electronic devices that access off-chip memory (such as (synchronous) dynamic RAM-(S)DRAM) via Chip-To-Chip (C2C) or Low-Latency Interface (LLU) links. In these cases, accurate and reliable real-time measurements are required to perform appropriate design configuration analysis.

Although at least some aspects of the embodiments described herein with reference to the drawings comprise computer processes performed in processing systems or processors, the invention also extends to computer programs, particularly computer programs on or in a carrier, adapted for putting the invention into practice. For example, any of the methods of FIGS. 3A, 3B and 4 may be implemented by a programmable processing system. The program may be in the form of non-transitory machine code, source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware). In embodiments described herein, the latency measurement apparatus resides on a single die; however, target logic units for which latency is measured need not reside on the same die. Additional, exemplary embodiments that are implemented at least in part by computer software may be implemented by processing units that form part of one or more separate dies.

The above embodiments are to be understood as illustrative examples of the invention. Further embodiments of the invention are envisaged. A non-exhaustive selection of variations is set out herein. For example, instead of separate transaction event (e.g. initiation and/or completion) and identifier signals, a single signal may be received. For example, the first signal line 205 and/or the third signal line 235 may be omitted such that the presence of an interconnect transaction identifier on one of the second and fourth signal lines respective indicates an initiation and completion event. A transaction identifier need not be received directly on a signal line; for example, a binary signal on multiple signal lines or a ternary signal on a single signal line may indicate one or more of an initiation and completion event, one or more of the first and second queue controllers may then be arranged to access a transaction identifier in a predefined register. The transaction counter 255 need not be coupled to the third signal line 235; for example, any other indication of a transaction completion event, such as receipt of an interconnect transaction identifier on the fourth signal line 240. A further variation comprises storing a list of the 'n' lowest and/or 'n' highest latency values in the respective ones of the minimum latency module 270 and/or maximum latency module 275, wherein in the examples above n=1. In implementations of this variation n may be a value greater than 1, such as 3, 5 or 10. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of measuring a latency associated with a transaction between logic units, the transaction taking place over an on-chip interconnect, the method comprising:
   in response to a first transaction initiation event, the first transaction initiation event having an associated transaction identifier, adding a first time value to a first data queue, the first data queue being associated with the transaction identifier for the first transaction initiation event;
   in response to a second transaction initiation event, the second transaction initiation event having an associated transaction identifier, adding a second time value to a second data queue, the second data queue being associated with the transaction identifier for the second transaction initiation event;
   in response to a first transaction completion event, the first transaction completion event having an associated transaction identifier:
      outputting the first time value from the first data queue if the transaction identifier associated with the first transaction completion event corresponds to the transaction identifier associated with the first transaction initiation event, and
      outputting the second time value from the second data queue if the transaction identifier associated with the first transaction completion event corresponds to the second transaction identifier associated with the second transaction initiation event; and
   determining a first latency measurement using a time value corresponding to the first transaction completion event and the one of the first time value and the second time value that is output.

2. A method according to claim 1, comprising:
   in response to a second transaction completion event, the second transaction completion event having an associated transaction identifier:
   outputting the second time value from the second data queue if the transaction identifier associated with the first transaction completion event corresponded to the transaction identifier associated with the first transaction initiation event and the transaction identifier associated with the second transaction completion event corresponds to the transaction identifier associated with the second transaction initiation event, and
   outputting the first time value from the first data queue if the transaction identifier associated with the first transaction completion event corresponded to the transaction identifier associated with the second transaction initiation event and the transaction identifier associated with the second transaction completion event corresponds to the transaction identifier associated with the first transaction initiation event; and
   determining a second latency measurement using a time value corresponding to the second transaction completion event and the one of the second time value and the first time value that is output in response to the second transaction completion event.

3. A method according to claim 1, wherein the first and second data queues comprise First-In First-Out data queues.

4. A method according to claim 1, comprising:
counting a number of transaction completion events; and
summing a plurality of latency measurements for the number of transaction completion events;
wherein an average latency measurement is calculated based on the counted number of transaction completion events and the summed latency measurements.

5. A method according to claim 1, comprising:
comparing at least one of the first and second latency measurements with a stored minimum latency value; and
replacing the stored minimum latency value with the compared latency measurement if the compared latency measurement is less than the stored minimum latency value.

6. A method according to claim 1, comprising:
comparing at least one of the first and second latency measurements with a stored maximum latency value; and
replacing the stored maximum latency value with the compared latency measurement if the compared latency measurement is greater than the stored maximum latency value.

7. A method according to claim 1, comprising:
in response to a third transaction initiation event, the third transaction initiation event having an associated transaction identifier and
before at least one of the first time value and the second time value are output from their respective data queues:
adding a third time value to the first data queue if the transaction identifier associated with the third transaction initiation event corresponds to the transaction identifier associated with the first transaction initiation event, the first data queue comprising, before addition, the first time value, and
adding a third time value to the second data queue if the transaction identifier associated with the third transaction initiation event corresponds to the transaction identifier associated with the second transaction initiation event, the second data queue comprising, before addition, the second time value.

8. A latency measurement apparatus for measuring a latency of a transaction between logic units, the transaction taking place over an on-chip interconnect, the latency measurement apparatus comprising:
a first queue controller arranged to add, responsive to receiving a transaction initiation event, a time value as an initiation time value to a data queue, the data queue being associated with a transaction identifier for the received transaction initiation event; and
a second queue controller arranged to access, responsive to receiving a transaction completion event, an initiation time value in a data queue, the data queue being associated with a transaction identifier for the received transaction completion event,
wherein a latency measurement is determined based on the accessed initiation time value and a time value generated in response to receiving said transaction completion event and
wherein, the first queue controller is arranged to add, following receipt of a first transaction initiation event, a second initiation time value for a second transaction initiation event to a data queue before a transaction completion event is received that has an associated transaction identifier corresponding to a transaction identifier associated with the first transaction initiation event.

9. An apparatus according to claim 8, wherein the second queue controller is arranged to access the second initiation time value in response to a transaction completion event before a transaction completion event is received that has an associated transaction identifier corresponding to the transaction identifier associated with the first transaction initiation event.

10. An apparatus according to claim 8, wherein the first queue controller is arranged to add an initiation time value to a data queue that comprises a plurality of initiation time values associated with a particular transaction identifier and the second queue controller is arranged to access the earliest initiation time value from a data queue in response to receiving a transaction completion event.

11. An apparatus according to claim 8, wherein each data queue comprises a First-In First-Out data queue.

12. An apparatus according to claim 8, comprising:
a transaction counter to count a number of received transaction completion events; and
a latency accumulator to sum a plurality of latency values, wherein an average latency is calculated based upon the values of transaction counter and the latency accumulator.

13. An apparatus according to claim 12, wherein the transaction counter and latency accumulator are arranged to respectively count and sum a particular subset of transaction identifiers.

14. An apparatus according to claim 8, comprising at least one of:
a minimum latency comparator to compare a determined latency measurement with a stored minimum latency value and replace the stored minimum latency value with the determined latency measurement if the determined latency measurement is less than the stored minimum latency value; and
a maximum latency comparator to compare a determined latency measurement with a stored maximum latency value and replace the stored maximum latency value with the determined latency measurement if the determined latency measurement is greater than the stored maximum latency value.

15. An apparatus according to claim 8, wherein the latency measurement apparatus has an active state and an inactive state and a latency measurement is only determined in the active state.

16. A system-on-a-chip for an electronic device comprising:
a first processor;
a second processor;
an interconnect for coupling the first processor and second processor, the first processor and second processor communicating through one or more transactions across the interconnect; and
a latency measurement apparatus as claimed in claim 8.

17. A non-transitory computer readable storage medium comprising a set of computer readable instructions stored therein, which, when executed by a processing system, cause the processing system to perform a method for measuring a latency associated with a transaction between logic units, the transaction taking place over an on-chip interconnect, the method comprising:
in response to a first transaction initiation event, the first transaction initiation event having an associated transaction identifier, adding a first time value to a first data queue, the first data queue being associated with the transaction identifier for the first transaction initiation event;

in response to a second transaction initiation event, the second transaction initiation event having an associated transaction identifier, adding a second time value to a second data queue, the second data queue being associated with the transaction identifier for the second transaction initiation event;

in response to a first transaction completion event, the first transaction completion event having an associated transaction identifier:

outputting the first time value from the first data queue if the transaction identifier associated with the first transaction completion event corresponds to the transaction identifier associated with the first transaction initiation event, and outputting the second time value from the second data queue if the transaction identifier associated with the first transaction completion event corresponds to the second transaction identifier associated with the second transaction initiation event; and determining a first latency measurement using a time value corresponding to the first transaction completion event and the one of the first time value and the second time value that is output.

18. The non-transitory computer readable storage medium according to claim 17, wherein the computer readable instructions cause the processing system to perform a method comprising:

in response to a second transaction completion event, the second transaction completion event having an associated transaction identifier:

outputting the second time value from the second data queue if the transaction identifier associated with the first transaction completion event corresponded to the transaction identifier associated with the first transaction initiation event and the transaction identifier associated with the second transaction completion event corresponds to the transaction identifier associated with the second transaction initiation event, and outputting the first time value from the first data queue if the transaction identifier associated with the first transaction completion event corresponded to the transaction identifier associated with the second transaction initiation event and the transaction identifier associated with the second transaction completion event corresponds to the transaction identifier associated with the first transaction initiation event;

determining a second latency measurement using a time value corresponding to the second transaction completion event and the one of the second time value and the first time value that is output in response to the second transaction completion event.

19. The non-transitory computer readable storage medium according to claim 17, wherein the first and second data queues comprise First-In First-Out data queues.

20. The non-transitory computer readable storage medium according to claim 17, wherein the computer readable instructions cause the processing system to perform a method comprising:

counting a number of transaction completion events; and summing a plurality of latency measurements for the number of transaction completion events;

wherein an average latency measurement is calculated based on the counted number of transaction completion events and the summed latency measurements.

21. The non-transitory computer readable storage medium according to claim 17, wherein the computer readable instructions cause the processing system to perform a method comprising:

comparing at least one of the first and second latency measurements with a stored minimum latency value; and replacing the stored minimum latency value with the compared latency measurement if the compared latency measurement is less than the stored minimum latency value.

22. The non-transitory computer readable storage medium according to claim 17, wherein the computer readable instructions cause the processing system to perform a method comprising:

comparing at least one of the first and second latency measurements with a stored maximum latency value; and replacing the stored maximum latency value with the compared latency measurement if the compared latency measurement is greater than the stored maximum latency value.

23. The non-transitory computer readable storage medium according to claim 17, wherein the computer readable instructions cause the processing system to perform a method comprising:

in response to a third transaction initiation event, the third transaction initiation event having an associated transaction identifier and before at least one of the first time value and the second time value are output from their respective data queues:

adding a third time value to the first data queue if the transaction identifier associated with the third transaction initiation event corresponds to the transaction identifier associated with the first transaction initiation event, the first data queue comprising, before addition, the first time value or adding a third time value to the second data queue if the transaction identifier associated with the third transaction initiation event corresponds to the transaction identifier associated with the second transaction initiation event, the second data queue comprising, before addition, the second time value.

* * * * *